United States Patent [19]

Blackmore

[11] Patent Number: 5,038,559
[45] Date of Patent: Aug. 13, 1991

[54] METHOD AND APPARATUS FOR SELECTIVELY VARYING AN EFFECTIVE FLUID FLOW AREA OF A JET ENGINE EXHAUST NOZZLE

[75] Inventor: Walter L. Blackmore, Tempe, Ariz.

[73] Assignee: Allied-Signal Inc., Morris Township, Morris County, N.J.

[21] Appl. No.: 622,046

[22] Filed: Jun. 19, 1984

Related U.S. Application Data

[63] Continuation-in-part of Ser. No. 333,501, Dec. 22, 1981, abandoned.

[51] Int. Cl.$^5$ ............................................. F02K 1/00
[52] U.S. Cl. ........................................ 60/204; 60/242; 60/271
[58] Field of Search ............... 60/204, 228, 233, 235, 60/238, 239, 271, 221, 222, 242; 239/265.11, 265.19; 181/213, 220

[56] References Cited

U.S. PATENT DOCUMENTS

| | | | |
|---|---|---|---|
| 2,405,723 | 8/1946 | Way | 60/266 |
| 2,580,962 | 1/1952 | Sedille | 236/265.31 |
| 2,957,307 | 10/1960 | Brandenberger et al. | 60/274 |
| 3,091,924 | 6/1963 | Wilder, Jr. | |
| 3,138,921 | 6/1964 | Prince, Jr. | 60/271 |
| 3,150,485 | 9/1964 | Hickerson | 60/271 |
| 3,404,842 | 10/1968 | McDonald | |
| 3,463,402 | 8/1969 | Langston, Jr. | 181/220 |
| 3,508,561 | 4/1970 | Cornish, III | |
| 3,514,957 | 6/1970 | Evans | 60/242 |
| 3,527,407 | 9/1970 | Mueller | 239/265.19 |
| 3,534,831 | 10/1970 | Nagamatsu | 181/220 |
| 4,175,640 | 11/1979 | Birch et al. | 181/220 |
| 4,298,089 | 11/1981 | Birch et al. | 181/220 |

*Primary Examiner*—Louis J. Casaregola
*Assistant Examiner*—T. S. Thorpe
*Attorney, Agent, or Firm*—Terry L. Miller; James W. McFarland; Robert A. Walsh

[57] ABSTRACT

A method and apparatus for varying the effective area of a jet engine exhaust nozzle. The apparatus includes a center body disposed upstream of the nozzle throat and configured to form a recirculation wake extending to and through the nozzle throat. The conditions of fluid flow are selectively variable, for example, by axial movement of a portion of the center body, to vary that portion of the nozzle throat which is effectively blocked by the recirculation wake so as to be unavailable for downstream motive fluid flow.

32 Claims, 2 Drawing Sheets

METHOD AND APPARATUS FOR SELECTIVELY VARYING AN EFFECTIVE FLUID FLOW AREA OF A JET ENGINE EXHAUST NOZZLE

This is a continuation-in-part of application U.S. Ser. No. 333,501, filed 22 Dec. 1981, now abandoned.

BACKGROUND OF THE INVENTION

This invention relates to jet engines. More particularly, this invention relates to a novel method and apparatus for varying the effective fluid flow area defined at the exhaust nozzle throat of a jet engine.

Jet engines provide motive power by accelerating a flow of high-temperature, high-pressure motive fluid through an exhaust nozzle to create a high-velocity fluid jet. The thrust provided by the fluid jet is approximately equal to its mass flow rate multiplied by its velocity. During high-power operation of the jet engine the throat of the exhaust nozzle must define an area sufficiently large to accommodate the mass flow of the fluid jet without undue restriction. However, during intermediate-power operation of the engine, during which the mass flow rate of motive fluid is reduced, the effective area of the exhaust nozzle throat must be reduced in order to accelerate the reduced flow of motive fluid to an adequate velocity. Thus, in order for a jet engine to efficiently provide varying thrust levels, the effective area of the exhaust nozzle throat of the engine must be variable.

A conventional method of varying the area of a jet engine exhaust nozzle throat is to provide the core structure of the engine with an axially movable tail piece. The tail piece is telescopically arranged with the remainder of the engine core structure and is movable in and out of the exhaust nozzle throat to vary the effective area of the nozzle throat. U.S. Pat. No. 2,405,723, granted 13 August 1946 to S. Way illustrates a jet engine having a movable tail piece.

A jet engine having a movable tail piece has a number of recognized deficiencies. Among these recognized deficiencies is the necessity for the core structure of the engine to extend to and through the exhaust nozzle throat. As a result, when the engine includes a long tail pipe the core structure of the engine must be made undesirably long. Therefore, the weight of the engine may be undesirably increased.

SUMMARY OF THE INVENTION

In view of the deficiencies of conventional jet engines having variable nozzle throats, it is an object for this invention to provide a method of varying the effective throat area of a jet engine exhaust nozzle by moving a recirculation fluid wake into and out of the nozzle throat.

To this end, the invention provides a method of varying the effective area of a jet engine nozzle throat by forming a recirculation fluid wake in the flow of motive fluid upstream of and extending downstream toward the nozzle throat, and moving the fluid wake in and out of the nozzle throat to vary the effective fluid flow area at the nozzle throat.

According to a preferred embodiment of the invention, the core structure or center body of the engine includes a truncated tail cone. The tail cone carries an axially movable sleeve member which defines the origin of the recirculation fluid wake. Axial movement of the sleeve member moves the fluid wake in and out of the nozzle throat to vary the effective throat area.

Another preferred embodiment of the invention includes a center body having a multitude of variable-angle guide vanes protruding from the aft end thereof into the fluid flow. The angle of incidence of the guide vanes is variable to increase the tangential velocity of the flowing motive fluid. The magnitude of the tangential velocity of the flowing fluid effects the recirculation fluid wake to move the wake in and out of the nozzle throat.

Yet another preferred embodiment of the invention includes an annular scroll chamber circumscribing the flow path for the motive fluid. Passages communicate the scroll chamber with the flow path so that pressurized fluid supplied to the scroll chamber communicates tangentially into the flow path. The pressurized fluid is effective to increase the tangential velocity of the flowing motive fluid. Thus, the recirculation fluid wake moves in and out of the nozzle throat in response to the supply of pressurized fluid to the scroll chamber.

An advantage of the invention is that the center body of the engine need not extend to the nozzle throat. A change in configuration of the center body, effected either by movable guide vanes or by elongation of the center body, is sufficient to move the recirculation fluid wake in and out of the exhaust nozzle throat. The fluid wake may also be moved relative to the nozzle throat by injecting pressurized fluid tangentially into the flowing motive fluid. The fluid wake may be moved by comparatively small, light-weight actuators. That is, the movement of the sleeve member and of the variable-angle guide vanes may be achieved by the exertion of relatively small forces. For example, relatively small hydraulic or electrically powered actuators are sufficient to move the fluid wake. Similarly, the injecting of pressurized fluid into the flow path requires only the opening of a valve device controlling the flow of pressurized fluid from a source thereof into the scroll chamber. Such a valve device may also be actuated by a relatively small, light-weight actuator.

Other objects and advantages of this invention will appear in light of the following detailed description of three preferred embodiments of the invention.

DETAILED DESCRIPTION OF THE PREFERRED EMBODIMENTS

Figure 1:
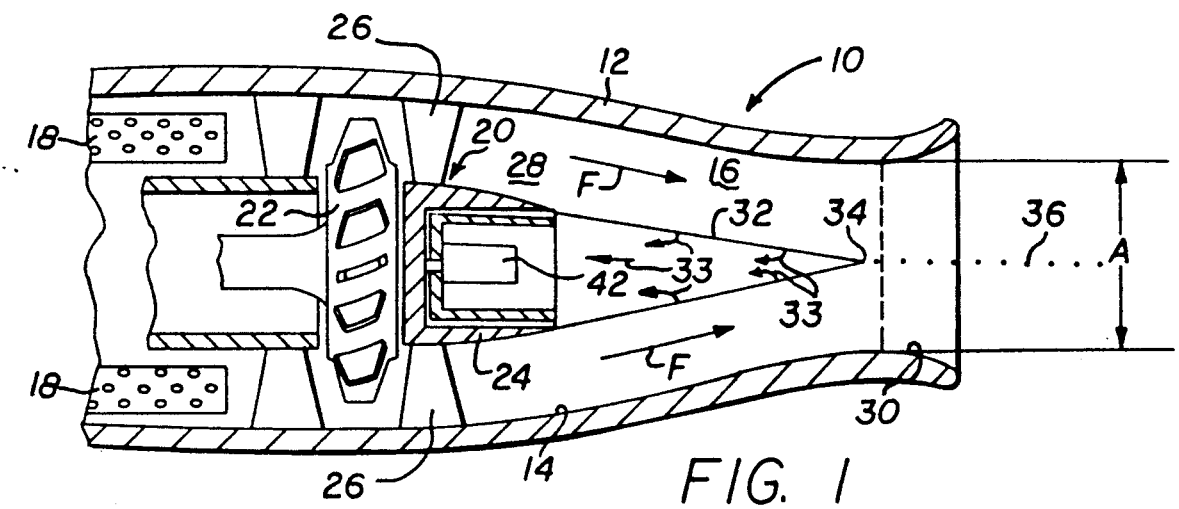
FIG. 1 is a fragmentary diagrammatic longitudinal view, partially in cross section, of a jet engine embodying the invention.
Figure 2:
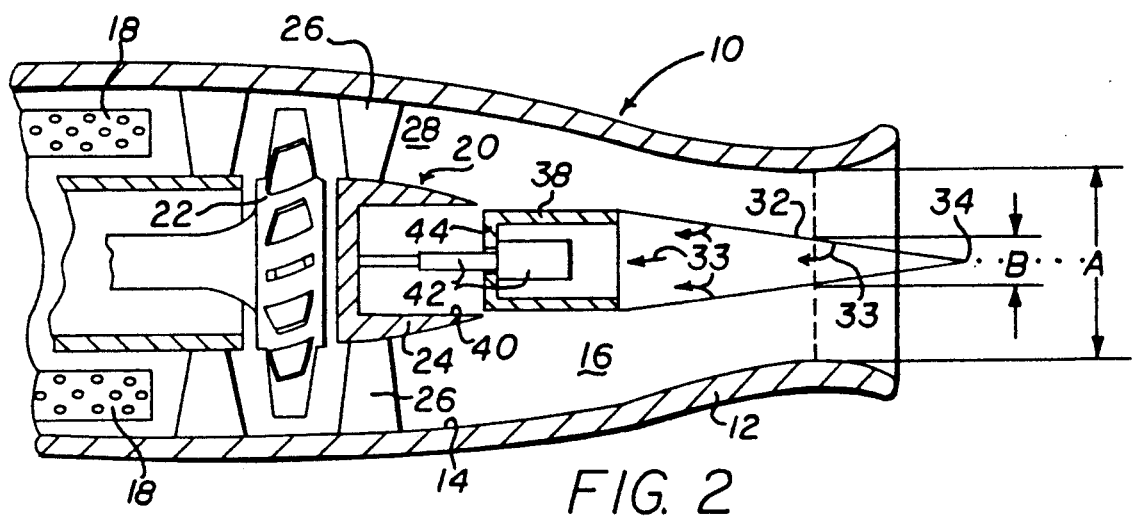
FIG. 2 is a view like FIG. 1 and showing the jet engine in an alternative operational configuration.

FIGS. 1 and 2 show the aft end of a jet engine 10 having an engine housing 12. The engine housing 12 defines a duct 14 which defines a flow path 16 for a flow of motive fluid (represented by arrows F). The motive fluid typically originates with a gas generator (not shown) which may include a compressor (also not shown) and one or more combustors 18. A center body 20 is disposed within the duct 14 and includes a turbine 22 and a truncated tail cone 24. The tail cone 24 is supported concentrically within the duct 14 by a plurality of radially extending struts 26 (only two of which are visible in FIG. 1) which engage the housing 12. Because of the presence of the center body 20 within the duct 14, the flow path 16 is annular upstream of the tail cone 24. The housing 12 and tail cone 24 cooperate downstream of the turbine 22 to define an annular diffuser section 28 for the motive fluid flowing from the turbine. Downstream of the diffuser 28, the housing 12 converges to define a nozzle throat 30 (illustrated by dashed line) having a diameter A forming an appropriate area for the flow of motive fluid. The center body 20 causes a fluid wake 32 to extend downstream from the tail cone 24. The fluid wake 32 terminates at a point 34 upstream of the nozzle throat 30. A relatively small core of turbulence 36 extends downstream from the terminus point 34 of the wake 32. Thus, substantially all of the area of the nozzle throat 30 is available for the flow of motive fluid.

In order to vary the flow area of the nozzle throat 30, an annular sleeve member 38 is movably carried by the tail cone 24. The sleeve member 38 is axially movable with respect to a recess 40 defined by the tail cone 24. An extensible actuator 42 is secured to an end wall 44 of the sleeve member and to the tail cone 24, viewing FIG. 2. Consequently, the sleeve member 38 is axially movable between a first retracted position, illustrated in FIG. 1, and an extended position, viewing FIG. 2.

When the sleeve member 38 is moved rightwardly from the retracted position to an extended position, the fluid wake 32 and the terminus point 34 also move rightwardly.

FIG. 2 illustrates that the fluid wake 32 is movable through the nozzle throat 30. At the nozzle throat, the fluid wake defines a diameter B. Thus, the effective area available for the flow of motive fluid is reduced to a value less than that defined by the diameter A. The reduced effective flow area at the nozzle throat is substantially that of an annulus having an outer diameter A and an inner diameter B.

It will be recognized by those skilled in the art to which the present invention pertains that the truncated tail cone 24 originates a classical base wake in fluid F. That is, the wake 32 is a recirculation or reverse flow type of wake which is generally bounded by a mixing region and which includes a core within which the fluid velocity is substantially zero at the outer regions thereof, and has an upstream or negative velocity within the core, as is represented by arrows 33, viewing FIGS. 1 and 2. Moreover, the wake 32 because of its recirculation reverse flow is clearly distinguishable from fluid boundary layer wakes wherein the flow always has a positive downstream velocity, or a zero velocity. Because the wake 32 comprises fluid flowing in the upstream direction (leftwardly viewing FIGS. 1 and 2) extension of wake 32 into the nozzle throat 30 decreases the area thereof which is available for downstream flow of fluid F.

Figure 3:
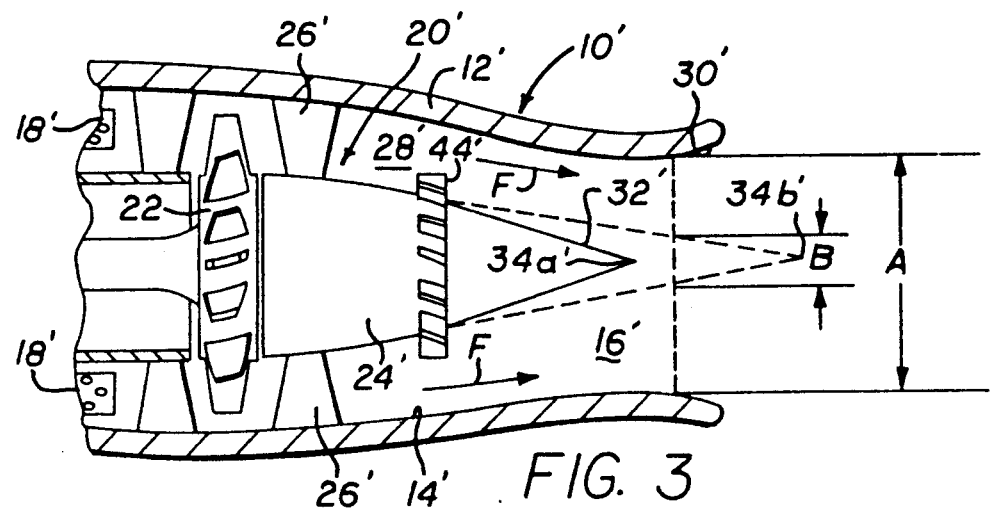
FIG. 3 is a view like FIG. 1, but showing an alternative construction for a jet engine embodying the invention.

FIG. 3 illustrates an alternative construction for a jet engine embodying the invention. In order to obtain reference numerals for use in FIG. 3, features illustrated in FIG. 3 are referenced with the same numerals used in FIGS. 1 and 2 with a prime added.

Viewing FIG. 3, it will be seen that a jet engine 10' includes a housing 12'. A duct 14' extends through the housing 12' to define a flow path 16' for a flow of motive fluid (represented by arrows F). Combustors 18' and a center body 20' are disposed within the duct 14' along with a turbine wheel 22'. The center body 20' includes a truncated tail cone 24' supported in the duct 14' by struts 26'.

The tail cone 24' cooperates with the housing 12' to define an annular diffuser section 28'. Downstream of the diffuser section 28', the housing 12' converges to define a nozzle throat 30' having a diameter A. Downstream of the tail cone 24', the flowing fluid F forms a fluid wake 32' having a terminus point 34'a.

A multitude of radially outwardly extending variable-angle guide vanes 44' are carried by the tail cone 24' of the center body 20'. The guide vanes 44' are movable about respective radially extending axes so that their angle of incidence with respect to the flowing motive fluid is selectively variable. An actuator (not shown) within the tail cone 24' is drivingly coupled with the guide vanes 44' to collectively vary their angle of incidence in response to an input signal. Because mechanisms for collectively moving an annular array of vanes is well known in the jet engine art, further explanation of the structure illustrated in FIG. 3 is deemed unnecessary.

As is well known in the jet engine art, the motive fluid flowing from the turbine 22' may have a purely axial flow or may have a tangential velocity (swirl) either in the same or opposite direction with respect to turbine rotation. The magnitude of the swirl of the motive fluid influences the fluid wake 32'. The fluid wake 32' elongates with increasing swirl magnitude and shortens with decreasing swirl magnitude. Viewing FIG. 3, the fluid wake 32' has a terminus point 34'a when the guide vanes 44' are positioned to have a zero angle of incidence with respect to the flowing motive fluid. The terminus point 34'a is upstream of the nozzle throat 30' so that substantially all of the throat area is available for fluid flow. When the guide vanes 44' are positioned to impart a swirl to axially flowing motive fluid or to increase the swirl magnitude of swirling motive fluid, the terminus point of the fluid wake moves downstream to a point 34'b, as is shown in dashed lines in FIG. 3. Thus, it will be seen that the fluid wake 32' moves through the nozzle throat 30' in response to an increased swirl of the motive fluid.

Figure 4:
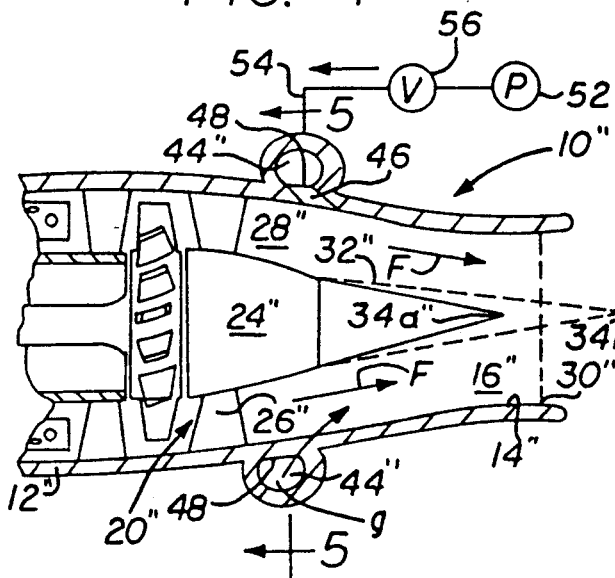
FIG. 4 is a view like FIGS. 1 and 3 but showing yet another alternative construction for a jet engine embodying the invention.
Figure 5:
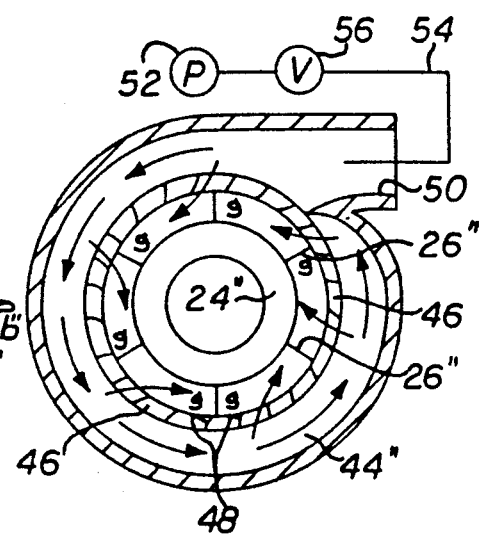
FIG. 5 is a transverse cross-sectional view taken along the line 5—5 of FIG. 4.

FIGS. 4 and 5 illustrate yet another alternative construction for a jet engine embodying the invention. In order to obtain reference numerals for use in FIGS. 4 and 5, features illustrated in these Figures are referenced with the same numerals used in FIGS. 1-3 with a double prime added.

Viewing FIGS. 4 and 5, it will be seen that a jet engine 10" includes a housing 12" having a duct 14" defining a flow path 16" for a flow of motive fluid (illustrated by arrows F). The engine 10" includes a center body 20" having a truncated tail cone 24" supported by struts 26" and cooperating with the housing 12" to define a diffuser section 28". The housing 12" defines a circumferentially extending scroll chamber 44". The scroll chamber 44" communicates with the flow path 16" via an annular passage 46. A multitude of guide vanes 48 are disposed in the annular passage 46. An inlet 50 of the scroll chamber 44" communicates with a source of fluid pressure 52 via a conduit 54. A valve device 56 is disposed in the conduit 54 to control the flow of pressurized fluid into the chamber 44" from the source 52.

When the valve 56 is opened to allow pressurized fluid to flow from the source 52, for example, from the compressor discharge area of the engine, into the scroll chamber 44", the pressurized fluid inherently possesses a tangential velocity with respect to the axis of the duct 14" because of the configuration of the scroll chamber 44". The pressurized fluid from chamber 44" communicates into the duct 14" via the passage 46 (as represented by arrows g) which in combination with the guide vanes 48 insure that the tangential velocity of the pressurized fluid is employed to best advantage. By admixture, the pressurized fluid g imparts swirl to or increases the magnitude of the swirl of the motive fluid in the duct 14". Consequently, the fluid wake 32" may be moved into the nozzle throat 30". The terminus point of the wake 32" moves between the points 34"a and 34"b in response to the opening and closing of the valve 56.

Figure 6:
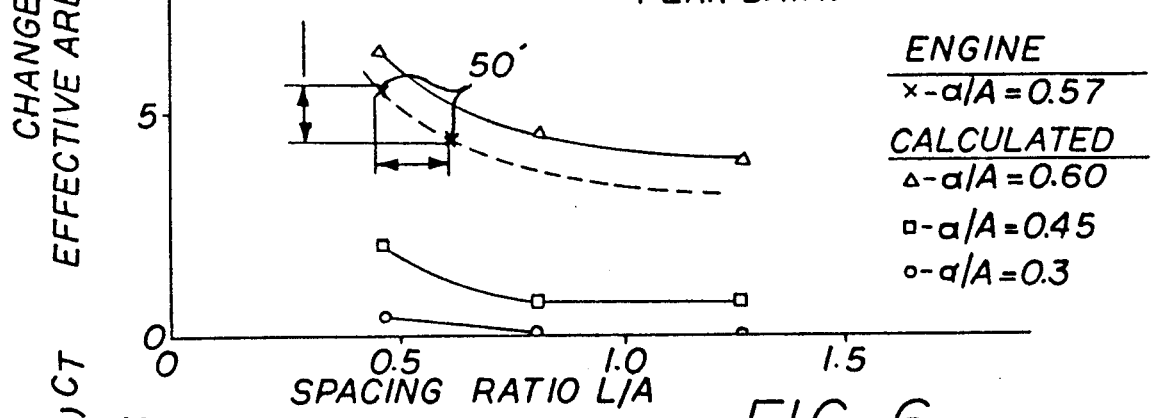
FIGS. 6 and 7 are graphs illustrating changes in operating characteristics of jet engines incorporating the invention with changes in the physical parameters of the engines.
Figure 7:
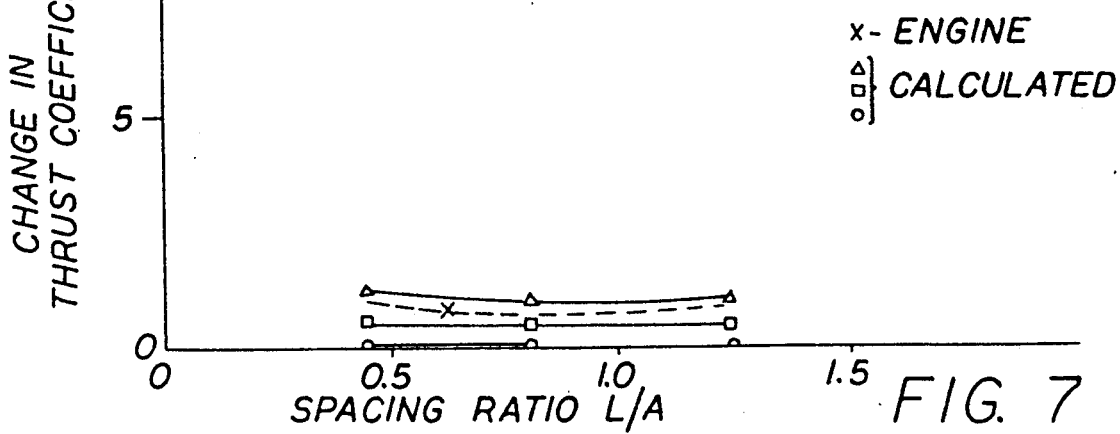

FIG. 6 graphically illustrates computed and actual values for decreases in the effective area ($C_D \Pi A^2/4$, where $C_D$ represents flow coefficient) of a nozzle throat with change in the spacing ratio (L divided by A) where L is the axial distance from the aft end of the tail cone to the nozzle throat, and A is the diameter of the nozzle throat. FIG. 7 illustrates changes in the thrust coefficient ($C_T$) of a nozzle according to the invention with change in the spacing ratio. The family of computed curves on graphs 6 and 7 represent engines having the indicated ratio of "a" to A where "a" is the diameter defined at the origin of the fluid wake i.e., the outer diameter of the sleeve member 38 in the engine illustrated in FIGS. 1 and 2, and A is the diameter of the nozzle throat.

As FIG. 6 illustrates, the movement of the fluid wake 32 with respect to the nozzle throat 30 can effect a significant reduction in the effective area of the nozzle throat. FIG. 6 also illustrates two test points 50' which were generated from data collected from an engine test. The test engine was fitted with a center body having an axially movable disc movement of which moved the wake origin in much the same way as does movement of the sleeve member 38, illustrated in FIG. 1. The two test points 50' show a good correlation between the calculated curves and actual test engine performance.

FIG. 7 illustrates that the thrust coefficient CT of an engine according to the invention is not significantly decreased as the spacing ratio (L/A) is decreased. Thus, the efficiency of an engine according to the invention remains relatively high as the area of the nozzle throat is decreased.

In view of the above, this invention may be of significant value in those jet engines which are required to fulfill a variety of missions. Such engines may benefit greatly from the ability to vary their nozzle flow coefficients to gain increased efficiency and performance.

I claim:
1. The method of operating a fluid jet reaction propulsion apparatus including a source of motive fluid, and nozzle throat means for accelerating a flow of said motive fluid to form a fluid jet, said method including the steps of:
 forming a reverse flow fluid wake in said flow of motive fluid upstream of said nozzle throat means; and
 moving said fluid wake in and out of said nozzle throat means to respectively decrease and increase the effective area of said nozzle throat means which is available for the down stream flow of said motive fluid.
2. The method of claim 1 wherein said propulsion apparatus includes a member movable to move said fluid wake with respect to said nozzle throat means, said method including the step of:
 moving said member to effect a movement of said fluid wake with respect to said nozzle throat.
3. The method of claim 2 wherein said propulsion apparatus includes a center body disposed in said flow of motive fluid upstream of said nozzle throat means, said center body movably carrying said member, and said member substantially defining an origin for said fluid wake, said method including the step of:
 axially moving said member to effect a movement of said fluid wake in and out of said nozzle throat means.
4. The method of claim 3 wherein said member includes an axially elongate sleeve telescopically arranged with said center body, said sleeve substantially defining an origin for said fluid wake, said method including the step of:
 telescopically moving said sleeve relative said center body.
5. The method of claim 1 wherein said propulsion apparatus includes a center body disposed in said flow of motive fluid upstream of said nozzle throat means and substantially defining an origin for said fluid wake, said center body movably carrying said member, and said member including a guide vane protruding into said flow of motive fluid, said guide vane being movable to effect a tangential velocity of said flow of motive fluid, said method including the step of moving said guide vane to effect movement of said fluid wake into and out of said nozzle throat means.
6. The method of claim 5 wherein said guide vane is movable about a radially extending axis to vary the angle of said guide vane relative to said flow of motive fluid, said method including the step of moving said guide vane about said axis.
7. The method of claim 2 wherein said member includes value means for controlling the flow of pressurized fluid from a source thereof into said flow of motive fluid, said pressurized fluid tangentially entering said flow of motive fluid to effect a tangential velocity of the latter, said method including the step of opening and closing said valve means to effect movement of said fluid wake relative said nozzle throat means.
8. A fluid jet reaction propulsion apparatus comprising duct means for communicating a flow of motive fluid to an exhaust portal, said duct means defining nozzle means including an exhaust nozzle throat for accelerating said flow of motive fluid to define a fluid jet, and area varying means disposed always entirely upstream of said exhaust nozzle throat for varying the area of the latter which is available for downstream flow of said motive fluid therethrough.
9. The invention of claim 8 wherein said area varying means includes means disposed within said duct means and spaced upstream of said exhaust nozzle throat for defining a reverse flow fluid wake extending therefrom downstream toward said exhaust nozzle throat, and means for moving said reverse flow fluid wake into and through said exhaust nozzle throat whereby said reverse flow wake diminishes the area of said exhaust nozzle throat which is available for downstream flow of said motive fluid.

10. The invention of claim 9 wherein said means for defining said reverse flow fluid wake includes a center body centrally disposed within said duct means.

11. The invention of claim 10 wherein said center body terminates in a downstream truncated end.

12. The invention of claim 9 wherein said means for moving said reverse flow fluid wake includes a member carried by said means for defining said fluid wake and movable in the upstream and downstream directions to respectively move said fluid wake.

13. The invention of claim 12 wherein said member comprises a sleeve movably telescopically associated with said means for defining said fluid wake.

14. The invention of claim 9 wherein said means for moving said fluid wake comprises means for imparting and relieving a tangential velocity of said flow of motive fluid.

15. The invention of claim 14 wherein said means for imparting and relieving a tangential velocity of said flow of motive fluid includes a movable guide vane disposed in said flow of motive fluid.

16. The invention of claim 15 wherein said guide vane is carried by said means for defining said fluid wake.

17. The invention of claim 14 wherein said means for imparting and relieving a tangential velocity of said flow of motive fluid includes means for introducing a tangential flow of pressurized fluid to said flow of motive fluid proximate to said fluid wake.

18. The invention of claim 17 wherein said introducing means includes a chamber circumscribing said duct means, pressure fluid source means selectively communicable with said chamber, and means tangentially communicating pressurized fluid flow from said chamber to said flow of motive fluid.

19. In a jet engine of the type comprising a source of motive fluid, and having a tail pipe defining a flow path for said flow of motive fluid and defining a converging nozzle throat, a center body in said tail pipe spaced upstream of said nozzle throat and carrying means for defining a reverse flow motive fluid wake extending downstream therefrom toward said nozzle throat, means for relatively moving said fluid wake to and through said nozzle throat.

20. The invention of claim 19 wherein said moving means comprises a body movably carried by said center body for relative upstream and downstream translation, said body being movable between a first and a second spaced apart positions and defining an origin of said fluid wake in at least one of said first and second positions.

21. The invention of claim 20 wherein said body comprises a sleeve member telescopically associated with the remainder of said center body.

22. The invention of claim 19 wherein said moving means comprises means for effecting said flow of motive fluid to effect a change of length of said fluid wake.

23. The invention of claim 22 wherein said affecting means comprises means for imparting a tangential velocity to said flow of motive fluid.

24. The invention of claim 23 wherein said imparting means comprises a guide vane disposed in said motive fluid flow.

25. The invention of claim 23 wherein said imparting means comprises means for injecting pressurized fluid tangentially into said motive fluid flow.

26. The method of varying the flow coefficient of an exhaust nozzle of a jet engine, said exhaust nozzle defining a nozzle throat through which is discharged a flow of motive fluid, said method including the steps of:
providing means for forming a reverse flow fluid wake in said flow of motive fluid upstream of and extending downstream toward said nozzle throat, and moving a portion of said reserve flow fluid wage to and through said nozzle throat to reduce the area thereof available for downstream flow of said motive fluid.

27. Jet propulsion engine apparatus comprising a source of engine motive fluid, an axially and circumferentially extending wall defining a flow path for axial flow of said engine motive fluid therein, said flow path converging in a downstream axial direction with respect to flow of said motive fluid from said engine to define a nozzle throat whereat said wall physically encompasses a minimum effective flow area for said motive fluid, said nozzle throat opening downstream to ambient, a center body disposed centrally within said flow path spaced upstream of said nozzle throat, said center body defining a downstream axially extending termination portion of substantially frusto-conical shape, said termination portion comprising means for originating upstream of said nozzle throat and within said motive fluid an aerodynamic fluid recirculation wake extending axially downstream therefrom toward said nozzle throat, said nozzle apparatus further comprising means for moving said fluid wake axially with respect to said nozzle throat between a first position of relatively lesser (or, no) partial obstruction of said nozzle throat by said fluid wake with respect to effective flow area thereof which is available for downstream flow of said motive fluid, and a second position wherein said fluid wake effects a relatively larger partial obstruction of said nozzle throat.

28. The invention of claim 27 wherein said means for originating said fluid wake comprises a downstream axially movable part of said termination portion.

29. The invention of claim 28 wherein said means for moving said wake comprises actuator means for selectively moving said movable part of said termination portion between selected axial relative positions.

30. The invention of claim 27 wherein said means for moving said wake comprises means for variably effecting a tangential velocity (swirl) of said flow of motive fluid.

31. The invention of claim 30 wherein said tangential velocity effecting means comprises a guide vane immersed in said fluid flow and selectively angularly movable.

32. The invention of claim 30 wherein said tangential velocity effecting means comprises means for injecting substantially tangentially with respect to said motive fluid flow a secondary flow of pressurized fluid.

\* \* \* \* \*